Dec. 9, 1958 R. E. SANDIFORD 2,864,075

SWITCHING NETWORK

Filed Jan. 3, 1956 2 Sheets-Sheet 1

INVENTOR.
ROBERT E. SANDIFORD

BY

Christie, Parker & Hale
ATTORNEYS

Dec. 9, 1958 R. E. SANDIFORD 2,864,075

SWITCHING NETWORK

Filed Jan. 3, 1956 2 Sheets-Sheet 2

INVENTOR.
ROBERT E. SANDIFORD

BY

Christie, Parker & Hale
ATTORNEYS

United States Patent Office 2,864,075
Patented Dec. 9, 1958

2,864,075

SWITCHING NETWORK

Robert E. Sandiford, Temple City, Calif., assignor to Consolidated Electrodynamics Corporation Application January 3, 1956, Serial No. 557,024

4 Claims. (Cl. 340—147)

This invention relates to improvements in electrical switching networks for commutating between a plurality of input terminals and a common output terminal.

Such switching networks are commonly employed in signal handling equipment such as for example in computers, data logging systems and telemetering systems.

The conventional switching network for commutating between a plurality of input terminals and a common output terminal employs a large number of independently actuated switches. To achieve a fast and smooth operation, these switches must be of the relatively expensive fast-and-smooth-acting type. Because of the number of independently actuated switches involved, the network for controlling the switching action of the various switches is extensive. For example, for commutating between one hundred input terminals and a common output terminal, a network having one hundred fast-acting relays may be employed, with the relays being actuated in succession by a one hundred stage electronic ring counter.

The switching network of the present invention requires a substantially lesser number of independently actuated switches to commutate among a given number of input terminals at a high rate, and only a small percentage of these switches need be of the fast-and-smooth-acting type. Accordingly, the switching network may be employed with a less extensive control network. By comparison with the example given above, the switching network of the present invention may employ only ten fast-acting relays together with twenty slow-acting relays, and the switching action of the relays may be controlled by a ring counter circuit having only thirty total stages. Thus, a substantial saving in bulk, complexity and expense is effected, and this comparative saving becomes more significant when more than one hundred input terminals are involved.

Basically the switching network of the present invention comprises a plurality of switches coupled to a common output terminal with the plurality of switches being divided into at least two groups. The switches are closed and opened one at a time in rapid consecutive order going cyclically through all of the switches in the first group and then through all of the switches in the second group before starting again with the switches in the first group. Switching means are provided for connecting a new series of input terminals severally to the switches in the first group during each successive time interval when the switches in the second group are being actuated, so that the following actuation of the switches in the first group serves to make connection successively between the respective input terminals of the series and the common output terminal. Likewise, switching means are provided for connecting a new series of input terminals severally to the switches in the second group during each successive time interval when the switches in the first group are being actuated. Thus, advance connections of input terminals to the switches are provided and each advance connection may be completed over the period of time it takes the switches in the preceding group to be successively actuated. Therefore, the switching means for providing advance connections may be relatively slow and rough acting without interfering with fast and smooth commutation between the input terminals and the common output terminal.

The basic switching network of the invention may be extended in various ways to accommodate different arrangements and number of input terminals. The invention is explained in more detail with reference to the drawings in which.

Figure 1:
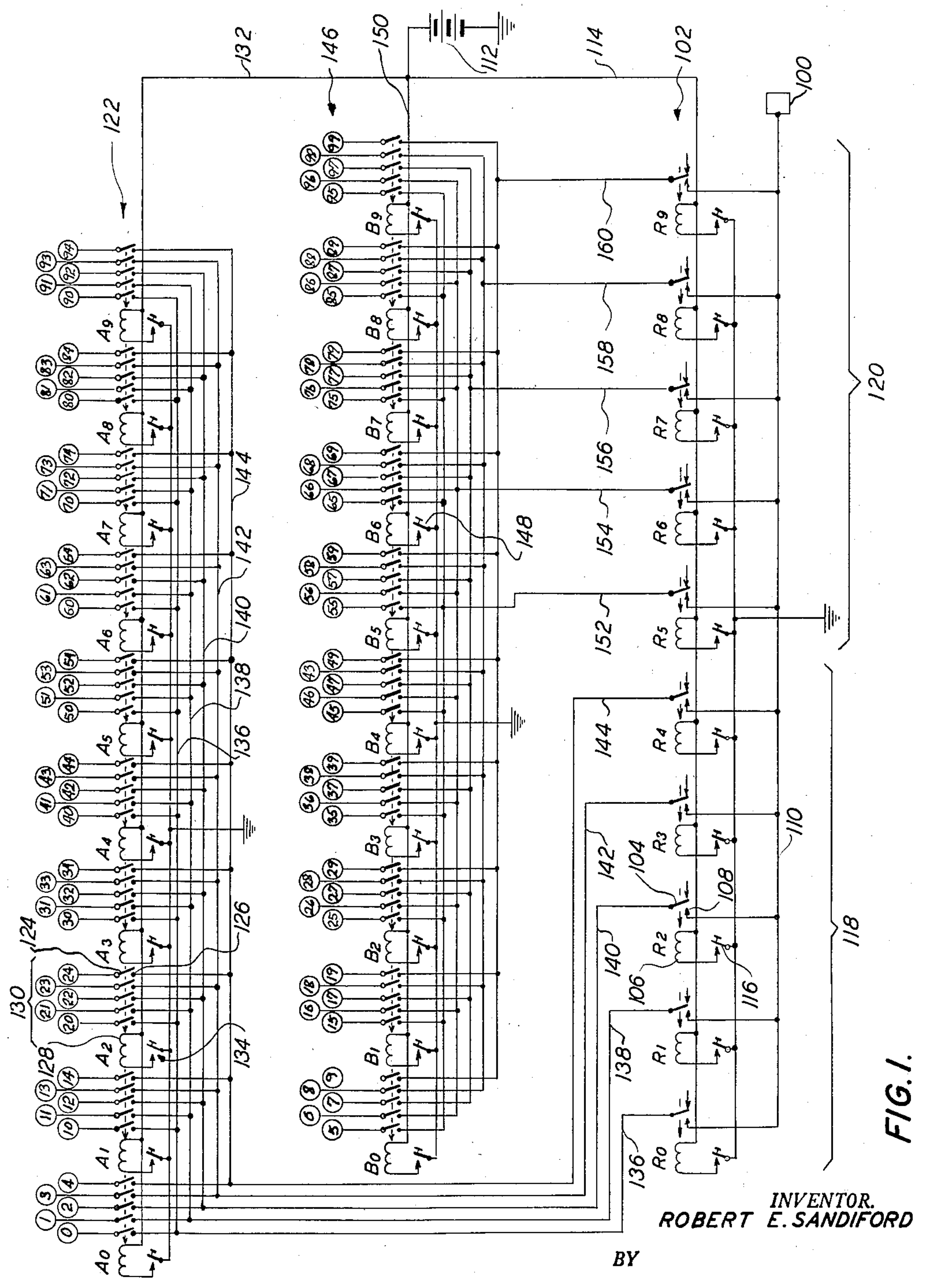
Fig. 1 is a schematic drawing of a preferred embodiment of the switching network of the invention.

Referring to Fig. 1, a plurality of input terminals is represented by the encircled numerals 0 to 99, and a common output terminal is shown at 100.

A set of fast-acting relays 102 includes ten individual relays that are designated respectively as $R_0$, $R_1$, $R_2$, $R_3$, $R_4$, $R_5$, $R_6$, $R_7$, $R_8$, $R_9$. This set of fast-acting relays may be called the "R" set. Each fast-acting relay of the set has a single armature 104, a winding 106, and a front contact 108. As shown, the front contact of each relay is coupled to the common output terminal 100 by electrical leads 110, and the winding of each relay is coupled on one side to the positive terminal of a battery 112 by an electrical lead 114 and coupled on the other side through a manual switch 116 to ground.

Generally speaking, the relays in the "R" set are individually actuated switches each having a single switching channel as represented by its armature and front contact, this switching channel being coupled to the common output terminal 100. The "R" set of switches is broken down into a first group of switches 118 that includes the switches $R_0$ to $R_4$ and a second group of switches 120 that includes the switches $R_5$ to $R_9$.

A first set of multiple contact relays 122 is coupled to the first group of switches 118 in the "R" set. There are ten multiple contact relays in this first set, and they are designated as $A_0$, $A_1$, $A_2$, $A_3$, $A_4$, $A_5$, $A_6$, $A_7$, $A_8$, $A_9$. The first set of multiple contact switches is then referred to as the "A" set.

Each multiple contact relay in the "A" set has five armatures 124 with five corresponding front contacts 126, and a winding 128 which serves to actuate all the armatures of the relay together. The individual armatures in each multiple contact relay are severally coupled to a separate series of input terminals 130, and the winding of each multiple contact relay is coupled on one side to the positive terminal of the battery 112 by an electrical lead 132, and coupled on the other side through a manual switch 134 to ground. Corresponding front contacts of each of the multiple contact relays in the "A" set are coupled together in parallel sets, the parallel sets being represented respectively by the five electrically independent circuits 136, 138, 140, 142 and 144. As shown, the circuit 136 is connected to the armature of the relay $R_0$, the circuit 138 is coupled to the armature of the relay $R_1$, the circuit 140 is coupled to the armature of the relay $R_2$, the circuit 142 is connected to the armature of the relay $R_3$, and the circuit 144 is connected to the armature of the relay $R_4$.

In more general terms, there is a first set of multiple switches 122 with each multiple switch having a predetermined number of switching channels adapted to switch together. Corresponding switching channels of the multiple switches are coupled together in parallel sets, with each parallel set of switching channels being coupled to the switching channel of a separate switch in the first group 118 of the "R" set.

A second set of multiple contact relays 146 may be called the "B" set and includes ten separate multiple contact relays as represented by $B_0$, $B_1$, $B_2$, $B_3$, $B_4$, $B_5$, $B_6$, $B_7$, $B_8$, $B_9$. The "B" set of multiple contact relays is identical to the "A" set in structure. There is a manual switch 148 for each of the relay windings in the "B" set for coupling one end of the winding to ground, and there is an electrical lead 150 coupled between the opposite end of all of the windings and the positive terminal of the battery 112. As before, the relays in the "B" set may be called multiple switches, and the separate switching channels of each of the multiple switches are severally connected to a separate series of input terminals. Corresponding switching channels of the multiple switches in the "B" set are coupled in parallel sets as represented by the separate electrical circuits 152, 154, 156, 158 and 160, with each parallel set of switching channels being coupled to the switching channel of a separate switch in the second group 120 of the "R" set.

When any one of the manual switches is closed, current will flow from the battery through the corresponding relay winding and close the associated armatures with the front contacts. Therefore, the particular manual switches that are closed at any time determine which particular input terminal is at that time connected to the common output terminal 100.

To appreciate how the switching network operates, consider at the start that the windings of the switches $A_0$, $B_0$, and $R_0$ are energized and that the windings of all the other switches are not energized, so that the 0 input signal (input terminal) appears at the output terminal. Then, the following tabulation indicates the operating sequence and the resulting commutation.

| Energize | De-energize | Signal at Output |
|---|---|---|
| $R_1$ | $R_0$ | 1 |
| $R_2$ | $R_1$ | 2 |
| $R_3$ | $R_2$ | 3 |
| $R_4$ | $R_3$ | 4 |
| $R_5$, $A_1$ | $R_4$, $A_0$ | 5 |
| $R_6$ | $R_5$ | 6 |
| $R_7$ | $R_6$ | 7 |
| $R_8$ | $R_7$ | 8 |
| $R_9$ | $R_8$ | 9 |
| $R_0$, $B_1$ | $R_9$, $B_0$ | 10 |
| $R_1$ | $R_0$ | 11 |
| $R_2$ | $R_1$ | 12 |
| $R_3$ | $R_2$ | 13 |
| $R_4$ | $R_3$ | 14 |
| $R_5$, $A_2$ | $R_4$, $A_1$ | 15 |
| $R_6$ | $R_5$ | 16 |
| $R_7$ | $R_6$ | 17 |
| $R_8$ | $R_7$ | 18 |
| $R_9$ | $R_8$ | 19 |
| $R_0$, $B_2$ | $R_9$, $B_1$ | 20 |

etc., in similar manner.

With this mode of operation, the "A" and "B" relay sets may be slow-acting to the point that contact closure need not be complete until five steps of the high-speed "R" relay set has taken place. Smooth transfer, signal-to-signal, is the result.

Figures 2, 3:
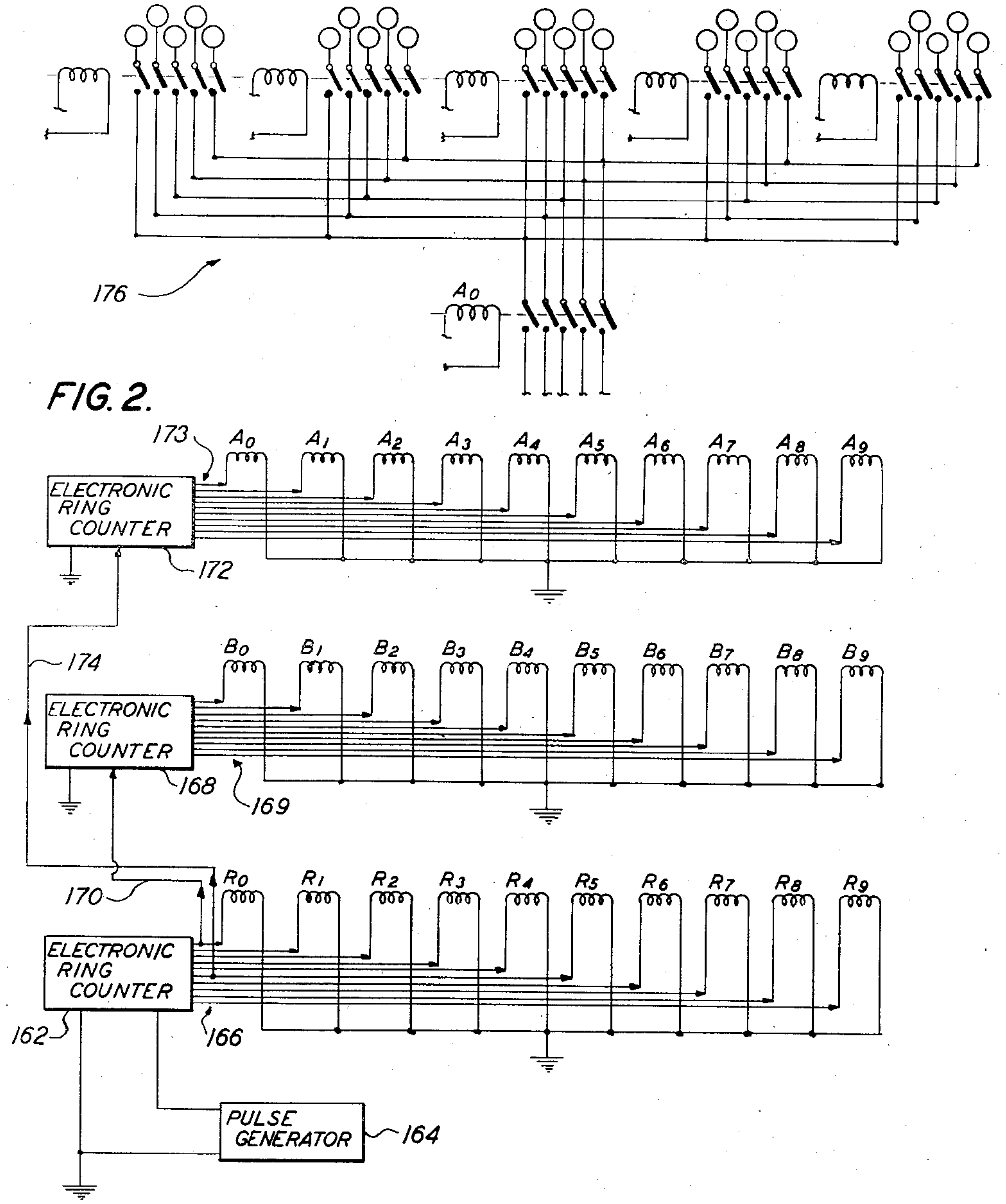
Fig. 2 is a schematic drawing showing means for automatically actuating the switches in the network of Fig. 1.
Fig. 3 is a schematic drawing showing one way in which the network of Fig. 1 may be extended.

Referring now to Fig. 2, an automatic system for energizing the various relay windings shown in Fig. 1 is provided. This automatic system takes the place of the battery and the manual switches shown in Fig. 1. The automatic system is an electronic ring counter circuit. The detailed circuitry of each individual ring counter is not displayed, it being understood that such circuits may be of conventional form.

A first electronic ring counter 162 is actuated by a pulse generator 164. The first ring counter has ten stages as represented by the ten output leads 166. The ten output leads run respectively to the individual windings of the relays in the "R" set with the opposite ends of all the windings being commonly connected to ground.

Therefore, in accordance with the pulses received from the pulse generator, the ring counter will energize the individual fast-acting switches in the "R" set one at a time in rapid consecutive order and cyclically going through all of the switches in the first group $R_0$ to $R_4$ and then through all of the switches in the second group $R_5$ to $R_9$ before starting again with the switches in the first group.

A second electronic ring counter 168 is similarly connected by ten output leads 169 to the windings of the multiple contact relays in the "B" set. The second ring counter is pulsed by the pulse to the relay winding $R_0$ provided by the first ring counter, and a lead 170 is provided for this purpose.

Likewise, a third ring counter 172 has ten output leads 173 severally connected to the respective windings of the multiple contact relays in the "A" set. The third ring counter is pulsed by the pulse to the relay winding $R_5$ provided by the first ring counter, and a lead 174 is provided for this purpose.

The first electronic ring counter serves as means for automatically actuating the individual switches in the "R" set cyclically and in order, and the second and third electronic ring counters serve as synchronous means for automatically actuating the switches in the "B" and "A" sets. The result is that the particular actuated multiple switch in the "A" set which is coupled to the first set of fast acting switches $R_0$ to $R_4$ is changed during the time that the switches in the second set $R_5$ to $R_9$ are being actuated, and the particular actuated multiple switch in the "B" set which is coupled to the second set of fast acting switches $R_5$ to $R_9$ is changed during the time the switches in the first set $R_0$ to $R_4$ are being actuated. Thus, a new series of input terminals is constantly being connected in advance of the actuation of the switches in the "R" set, and each advance connection may be completed over the period of time it takes the switches in the preceding group in the "R" set to be successively actuated.

Therefore, relatively cumbersome multiple switches do not interfere with fast and smooth commutation between the input terminals and the common output terminal. While most any conventional ring counter will serve, the detailed circuitry of a particular electronic ring counter suitable for use in actuating the switches of the network of Fig. 1 is shown in my co-pending application Serial Number 558,951, filed on January 13, 1956.

By inspection of the table given above, it can be seen that the switches in the fast-acting "R" set are energized at a rate which is approximately the total rate at which the switches in the "A" and "B" sets are being actuated multiplied by the number of switching channels in one multiple switch.

The invention is not limited to one hundred input terminals but may be extended to any number by merely increasing the number of multiple switches in the "A" and "B" sets, or by increasing the number of switches in the high-speed "R" set with a corresponding increase in the number of switching channels in each multiple switch in the "A" and "B" sets. Also, the switches in the fast-acting "R" set may be broken down into more than two groups, with another set of multiple switches being provided. In any event, the basic apparatus disclosed in Fig. 1 may be modified to accommodate practically any number of input terminals by mere repetition and extension.

With reference to Fig. 3, a particular extension of the switching network shown in Fig. 1 is displayed. This may be characterized as a pyramid extension. All of the multiple switches in the "A" and "B" sets such as the multiple switch $A_0$ may have a further plurality of multiple switches 176 coupled to it. In this instance the switches in the "A" and "B" sets would be actuated at a much slower rate so that for example when the $A_0$ switch is closed, it will remain closed for a sufficient time to allow the other multiple switches connected through it to be successively energized in alternation with energization of the multiple switches likewise further connected to the $B_0$ switch (not shown).

Referring again to Fig. 1, it should be noted that it makes no difference whether the various leads are connected with the armature of the relays or to the front contacts of the relays, because in either instance the armature serves as a switch and the particular lead is in effect coupled through the armature. Also, the choice in terminology between "input terminals" and "output terminals" is arbitrary, and the common output terminal 100 could just as well be called an input terminal with the input terminals represented by the encircled numerals 0 to 99 being called output terminals. Accordingly, in the following claims it is to be understood that the terms "input" and "output" may be reversed, and that the expression "connected through the armature" means connected to the armature or to the front contact of the relay.

While the invention has been described as employing relay switches, other kinds of switches including electronic types may be used.

I claim:

1. In a switching network for automatically connecting individual terminals of a plurality of input terminals one at a time in rapid succession to a common output terminal, the improvement which comprises a plurality of fast-acting switches coupled to the common output terminal and divided into a first group and a second group, means for automatically closing and opening the individual fast-acting switches one at a time in rapid consecutive order and cyclically going through all of the switches in the first group and then through all of the switches in the second group before starting again with the switches in the first group, switching means for connecting a new series of the input terminals of the plurality of input terminals severally to the switches in the first group during each successive time interval when the switches in the second group are being actuated so that the following actuation of the switches in the first group serves to make connection successively between the respective input terminals of the series and the common output terminal, and switching means for connecting a next successive new series of input terminals of the plurality of input terminals severally to the switches in the second group during each successive time interval when the switches in the first group are being actuated so that the following actuation of the switches in the second group serves to make connection successively between the respective input terminals of the series and the common output terminal, both switching means thereby cooperating to provide an automatic advance connection of input terminals to the switches, which advance connection may be completed over the time it takes one of the groups of switches to be actuated so that the switching means for making these advance connections may be relatively slow acting compared to the fast-acting switches.

2. In a switching network, the combination which comprises a first set of at least two slow switches actuated by a common first relay, a first set of fast switches corresponding in number to the switches on the first slow set and individually actuated by individual relays, a second set of at least two slow switches actuated by a common second relay, a second set of fast switches corresponding in number to the second set of slow switches and individually actuated by individual relays, individual switches of the first slow set being connected respectively in series to individual switches of the first fast set and individual switches of the second slow set being connected respectively in series to individual switches of the second fast set, a third set of slow switches corresponding in number to the first slow set and actuated by a common third relay, a fourth set of slow switches corresponding in number to the second slow set and actuated by a common fourth relay, individual switches of the third slow set being connected respectively in series with individual switches of the first fast set and in parallel with individual switches of the first slow set, and individual switches of the fourth slow set being connected respectively in series with individual switches of the second fast set and in parallel with individual switches of the second slow set, all of the switches of the fast sets being connected to a common terminal, means for automatically actuating the individual relays controlling the switches of the first and second fast sets cyclically and in order, and synchronous means for automatically actuating the relays controlling the slow sets of switches so that the set of actuated slow switches coupled to the first fast set is changed during the time the switches in the second fast set are being actuated, and so that the set of actuated slow switches coupled to the second fast set is changed during the time the switches in the first fast set are being actuated, thereby providing an advance actuation of the slow switches in anticipation of the actuation of the fast switches.

3. Apparatus of claim 2 wherein the relays controlling the fast-acting switches are actuated successively by an electronic ring counter, and the relays controlling the slow-acting switches are actuated by other ring counters synchronized with the first ring counter.

4. In a switching network, the combination which comprises at least two groups of switches, each group including a plurality of multiple switches with each multiple switch having a predetermined number of separate switching channels adapted to switch together, each group also having a plurality of single channel switches corresponding in number to said predetermined number of switching channels for one multiple switch, corresponding switching channels of the multiple switches in each group being separately coupled together in parallel sets with each parallel set of switching channels being coupled to a separate one of the single channel switches in the group, a common output for all of the single channel switches included in both groups, means for actuating the single channel switches one at a time in rapid consecutive order and cyclically going through all of the single channel switches in the first group and then through all of the single channel switches in the second group before starting again with the first group, means for actuating the multiple switches in the first group one at a time and operating to make the change from one multiple switch to the next during each interval when the single channel switches in the second group are being actuated, and means for actuating the multiple switches in the second group one at a time and operating to make the change from one multiple switch to the next during each interval when the single channel switches in the first group are being actuated.

References Cited in the file of this patent

UNITED STATES PATENTS

| | | |
|---|---|---|
| 1,714,969 | White | May 28, 1929 |
| 2,609,451 | Hansen | Sept. 2, 1952 |
| 2,677,725 | Schuler | May 4, 1954 |